United States Patent
Thorez et al.

(10) Patent No.: US 10,723,467 B2
(45) Date of Patent: Jul. 28, 2020

(54) METHOD FOR DETERMINING THE WATER CONTENT IN THE ATMOSPHERE, METHOD FOR DETECTING ICING CONDITIONS AND COMPUTER PROGRAMS

(71) Applicant: Zodiac Aerotechnics, Plaisir (FR)

(72) Inventors: Manuel Thorez, Les Molieres (FR); Laurent Paszkiewicz, Clamart (FR)

(73) Assignee: ZODIAC AEROTECHNICS, Plaisir (FR)

( * ) Notice: Subject to any disclaimer, the term of this patent is extended or adjusted under 35 U.S.C. 154(b) by 538 days.

(21) Appl. No.: 15/560,991

(22) PCT Filed: Mar. 23, 2016

(86) PCT No.: PCT/FR2016/050642
§ 371 (c)(1),
(2) Date: Sep. 22, 2017

(87) PCT Pub. No.: WO2016/151247
PCT Pub. Date: Sep. 29, 2016

(65) Prior Publication Data
US 2018/0058994 A1  Mar. 1, 2018

(30) Foreign Application Priority Data
Mar. 23, 2015 (FR) .................... 15 52402

(51) Int. Cl.
*B64D 15/20* (2006.01)
*G01B 9/02* (2006.01)
*G01N 15/02* (2006.01)
*G01N 15/14* (2006.01)

(52) U.S. Cl.
CPC ......... *B64D 15/20* (2013.01); *G01B 9/02043* (2013.01); *G01N 15/02* (2013.01);
(Continued)

(58) Field of Classification Search
CPC ..... B64D 15/20; G01B 9/02043; G01N 15/02
See application file for complete search history.

(56) References Cited

U.S. PATENT DOCUMENTS 5,932,795 A * 8/1999 Koutrakis ............ G01N 1/2205
422/80
8,812,236 B1 * 8/2014 Freeman ............... E21B 21/065
175/66

(Continued)

OTHER PUBLICATIONS

Yoshio Zama et al, "Simultaneous Measurement of Droplet Size and Three-Components of Velocity in Spray," Optical Review, Dec. 1, 2004, pp. 358-364, vol. 11, No. 6, Springer, Berlin, DE.

(Continued)

*Primary Examiner* — Lisa E Peters
(74) *Attorney, Agent, or Firm* — Patzik, Frank & Samotny Ltd.

(57) ABSTRACT

A method for determining the water content in the atmosphere by image processing comprises: determining the number of particles contained in a size range; measuring the mass of particles having a size in the size range from the determined number of particles; determining the number of particles having a size equal to a threshold size; evaluating the number of particles outside of the given size range from the determined number of particles and from the threshold size; estimating the mass of particles outside of the size range from the evaluated number of particles; and determining the water content by addition of the estimated mass and the measured mass.

14 Claims, 9 Drawing Sheets

(52) U.S. Cl.
CPC ..... *G01N 15/0227* (2013.01); *G01N 15/1434* (2013.01); *G01B 9/02041* (2013.01); *G01N 2015/144* (2013.01); *G01N 2015/1445* (2013.01); *G01N 2015/1486* (2013.01); *G01N 2015/1493* (2013.01)

(56) References Cited

U.S. PATENT DOCUMENTS

| | | | |
|---|---|---|---|
| 2006/0232780 A1 | 10/2006 | King | |
| 2008/0231854 A1 | 9/2008 | Seifert et al. | |
| 2009/0039249 A1* | 2/2009 | Wang | G01N 15/1459 250/287 |
| 2012/0012744 A1* | 1/2012 | Wang | G01N 15/0205 250/287 |
| 2013/0142214 A1* | 6/2013 | Schlotterbeck | G01S 17/86 374/17 |

OTHER PUBLICATIONS

Yoshio Zama et al, "Simultaneous measurement method of size and 3D velocity components of droplets in a spray field illuminated with a thin laser-light sheet," Measurement Science and Technology, Oct. 1, 2005, pp. 1977-1986, vol. 16, No. 10, IOP Publishing Ltd., Bristol, GB.

European Patent Office (EPO) International Search Report issued in corresponding PCT Application No. PCT/FR2016/050642, dated Jun. 27, 2016.

* cited by examiner

METHOD FOR DETERMINING THE WATER CONTENT IN THE ATMOSPHERE, METHOD FOR DETECTING ICING CONDITIONS AND COMPUTER PROGRAMS

FIELD OF THE INVENTION

The present invention is situated in the field of the detection of ice-forming conditions in an aircraft in flight.

In particular, the present invention relates to a method for determining the water content in the atmosphere and a method for detecting icing atmospheric conditions. The invention also relates to a computer program.

BACKGROUND OF THE INVENTION

Since the beginning of the 1990s, incidents with engines and anomalies in aerodynamic speed and temperature measurements in airliners have been observed at high altitude and low temperature. In 2004, a working group on the harmonisation of engines known as EHWG (Engine Harmonisation Working Group) established that icing conditions due to the presence of supercooled large droplets (SLDs), to the presence of ice crystals or to the simultaneous presence of SLDs and ice crystals gave rise to these anomalies. The American Federal Aviation Administration (FAA) and the European Aviation Safety Agency (EASA) introduced, in November 2014, changes to the regulations in force for overcoming the threat represented by such icy conditions for the safety of aircraft in flight. These new regulations are described in the document entitled "Aircraft and Engine Certification Requirements for Supercooled Large Drop, Mixed Phase and Ice Crystal Icing Conditions, Federal Aviation Administration Docket No. FAA-2010-0636, Amendment Nos. 25-140 and 33-34, Nov. 4, 2004".

The regulations CS25 and in particular Appendix O thereof ("14 CFR part 25, Appendix O") stipulate that water droplets with a diameter between 5 micrometres and 2300 micrometres must be able to be detected. The regulations CS33 and in particular Appendix D thereof ("14 CFR part 33, Appendix D") stipulate that ice crystals with a size of between 5 micrometres and 2700 micrometres must be able to be detected.

The interferometric laser imagining technique for determining the size of droplets, generally referred to as the ILIDS technique ("Interferometric Laser Imaging for Droplet Sizing"), developed about 30 years ago, makes it possible to measure the size of spherical droplets in one plane (analysis in two dimensions). According to this technique, the water droplets are illuminated by a laser sheet polarised at a specific observation angle. Two light points, referred to as glare points, are visible on the surface of the droplets. These glare points create an interference pattern having the form of parallel fringes when they are imaged in a plane outside the focal plane of an optical system. The interfringe, that is to say the distance between two successive fringes, is inversely proportional to the distance between these two glare points. Thus an interfringe measurement makes it possible to determine the diameter of the droplets.

This technique has also been used to determine a size of a solid particle as described in the documents "Z. ULANOWSKI et al, Retrieving the size of particles with rough and complex surfaces from two-dimensional scattering patterns. *Journal of Quantitative Spectroscopy and Radiative Transfer.* 2012" and "D CHICEA. Biospeckle size and contrast measurement application in particle sizing and concentration assessment. *Biophysics,* Sep. 12, 2006".

According to these documents, when a solid ice crystal of any shape and with a rough surface is illuminated by a laser sheet, a multitude of glare points are visible on the surface of the crystal. The image outside the focal plane shows a speckle image. The size of the speckle grain is inversely proportional to the largest size of the visible ice crystal.

However, ILIDS out-of-focus interferometric imaging makes it possible to measure only water droplets or ice crystals the sizes of which vary in a ratio of approximately a decade, in particular because of the limited performance of imagers existing on the market.

However, the size of the water drops and ice crystals present in the atmosphere varies between 5 µm and 2700 µm. This range of sizes is much greater than the range of sizes that can be determined by conventional interferometric imaging.

The aim of the invention is to propose a method for determining the water content in the atmosphere that takes account of the water and ice particles that have sizes of lying in the whole of the range of sizes established by the regulations.

SUMMARY OF THE INVENTION

To this end, the subject matter of the invention is a method for determining the water content in the atmosphere by processing images acquired by an out-of-focus interferometric imaging device, said device being solely able to image water and ice particles having a size lying in a given range of sizes, said method comprising the following steps For at least one image, a) determining the number of particles lying the given range of sizes from said image;

b) measuring the mass of particles having a size lying in the given range of sizes from the number of particles determined;

c) estimating the mass of particles having a size outside the given range of sizes, said estimation step comprising the following steps:

i) determining the number of particles having a size equal to a threshold size;

ii) evaluating the number of particles outside the given range of sizes from the number of particles determined during step i) and from the threshold size;

iii) estimating the mass of the particles outside the given range of sizes from the number of particles evaluated;

d) determining the water content by adding the estimated mass and the measured mass.

According to particular embodiments, the determination method comprises one or more of the following features:

- The number of particles is evaluated during step ii) by linear extrapolation from a predefined size beyond which there are no longer any particles in the atmosphere.
- When the particles are water particles, the predefined size is substantially equal to 2300 micrometres.
- When the particles are ice particles, the predefined size is substantially equal to 2700 micrometres.
- The number of particles evaluated during step ii) is considered to be constant and equal to the number of particles determined at step i) having a size equal to the threshold size.
- The method is implemented by a processing unit comprising a calculation unit and a storage unit, said storage unit comprising at least a predetermined distribution of the number of particles according to the size of these particles outside said given range of sizes, said predetermined distribution comprising a number of particles having said threshold size, and in which the number of particles is evaluated by multiplying the predetermined distribution comprising a number of particles having said threshold size, and in which the number of particles is evaluated by multiplying the predetermined distribution by the ratio between the number of particles determined at step i) and the number of particles in said distribution having said threshold size.

The number of particles is evaluated during step ii) by polynomial extrapolation from a plurality of numbers of particles determined at step i) and the size of these particles.

The polynomial equation is a logarithmic equation.

The given range of sizes is between 50 micrometres and 1000 micrometres, and is preferably between 70 micrometres and 700 micrometres, The invention also relates to a method for detecting icing atmospheric conditions, which comprises the following steps:
   determining the water content by implementing the determination method according to any of the features mentioned above;
   receiving an external temperature value;
   detecting icing atmospheric conditions from the water content and the external temperature value.

Finally, the invention relates to a computer program containing instructions for implementing the determination method described above when it is executed by a processor and a computer program containing instructions for implementing the detection method described above when it is executed by a processor.

BRIEF DESCRIPITON OF THE DRAWINGS

The invention will be understood better from a reading of the following description given solely by way of example and made with reference of the figures, in which.

DETAILED DESCRIPTION OF THE INVENTION

In the present patent application, the term "particle" has been used to designate both water droplets and ice crystals. The term "size di" has been used to define the size of a particle in the plane perpendicular to the diffusion axis as defined below. The water content is defined as being the quantity of solid and liquid water in a volume of air in the atmosphere.

Figure 1:
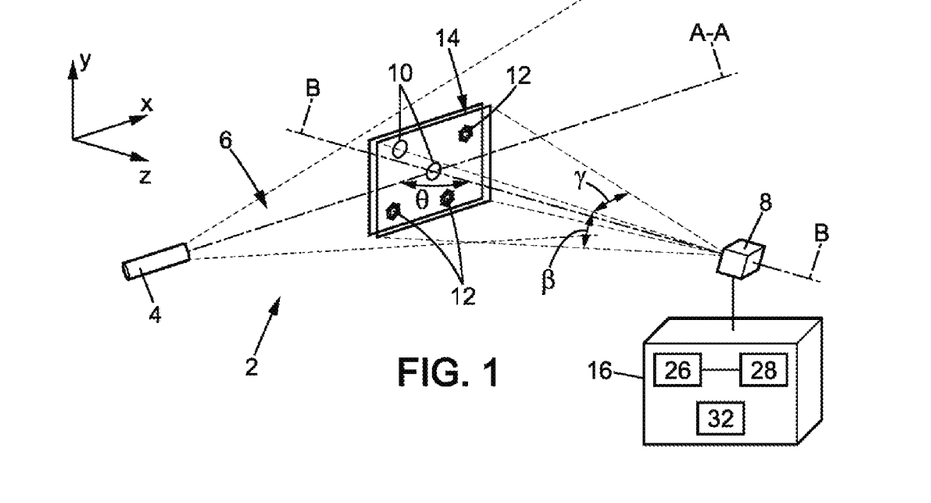
FIG. 1, which is a schematic view of the device for determining water content according to the present invention.

The method for determining the water content in the atmosphere according to the invention is implemented by the processing of images acquired by a determination device 2 depicted in FIG. 1. This determination device 2 makes it possible to acquire images by out-of-focus interferometric imaging (ILIDS). This determination device 2 is installed in an aircraft in flight.

The determination device 2 comprises:
   a laser emitter able to emit a pulsed laser beam 6 having an emission axis A-A.
   an out-of-focus imager 8 able to capture images of particles 10, 12 included in a sampling volume 14;
   a processing unit 16 in communication connection with the imager 8, for example in cabled communication connection.

The laser emitter 4 and the imager 8 are for example placed inside the fuselage of an aircraft and point towards the outside through a window.

The laser emitter 4 comprises a unit, not shown, able to emit the laser beam 6 and an optical device, not shown, able to focus the emitted laser beam 6 in a sheet. This sheet lies in a plane, referred to as the emission plane (x, y), considering the direct orthogonal reference frame (x, y, z) shown in FIG. 1.

Figure 2:
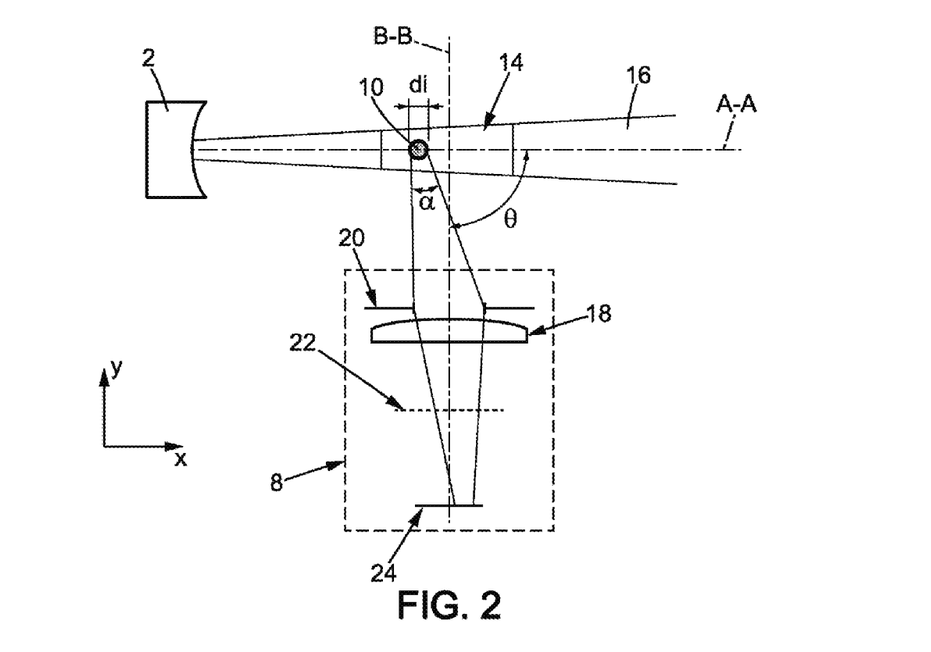
FIG. 2 is a plan view of the determination device shown in FIG. 1.

Preferably, the laser beam 6 has a form that diverges in a direction z perpendicular to the emission plane (x, y) from a part of the space in the vicinity of the laser emitter 2 towards a part of the space further away from the laser emitter 2, as can be seen in FIG. 2. This form is, for example, obtained by an optical system comprising two cylindrical lenses.

The laser beam 6 has a profile of uniform rectangular intensity generally referred to as "top hat". The laser beam 6 is polarised either in a plane (x, z) or in the emission plane (x, y).

The laser wavelength is for example equal to 532 nm or 1500 nm. The pulse frequency of the laser is synchronised at the frequency of acquisition of the images by the imager 8.

The imager 8 consists for example of a CCD camera. It has an optical axis B-B that forms an angle θ with the emission plane (x, y) of the laser sheet. This angle θ is generally referred to as the diffusion angle. It is fixed. It is predetermined so as to obtain, for each water particle, glare points having equivalent intensities. The diffusion angle is for example 90°.

The imager 8 is able to capture images formed by the diffusion of the laser beam 6 on the particles situated in the sampling volume 14. The particles imaged by the imager 8 are the water particles 10 and the ice particles 12 contained in the sampling volume 14.

With reference to FIG. 2, the imager 8 comprises a convergent optical system 18 of focal length F, a pupil 20 and an image acquisition plane 22 situated upstream of the focal plane 24 of the convergent optical system 18.

The imager 8 has a field of view defined by the field angles γ and β. These field angles γ and β and the distance between the imager 8 and the laser beam 6 determine the height and width of the sampling volume 14.

The pupil 20 of the optical system 18 and the length of the diffusion axis B-B lying between the pupil 20 and the emission axis A-A define a cone. The angle at the vertex of this cone is referred to as the collection angle α. The value of this collection angle is equal to:

$$\alpha = \operatorname{atan}(\Phi/D)$$

where a tan is the arc-tangent mathematical function,

φ is the diameter of the pupil 20 of the imager 8, and

D is the length of the diffusion axis B-B lying between the pupil 20 and the emission axis A-A.

The "defocusing" is the distance between the image acquisition plane 22 and the focal plane 24.

The acquisition parameters of the imager 8 are adapted to the range of sizes and concentrations of the particles that it is wished to measure. The acquisition parameters comprise the field angles γ, β, the defocusing, the focal distance F of the convergent optical system, the collection angle α, the distance between the laser beam and the imager, and the spatial resolution of the imager.

The processing unit 16 is able to receive at least one image 30 acquired by the imager 8 and to process this image using the determination method described below. The processing unit 16 is able to generate information relating to the water content in the atmosphere from the processing of this at least one image 30.

The processing unit 16 may also comprise an input 32 able to receive a temperature value of the external air. This external temperature value is for example supplied by an external temperature measurement device already existing in the aircraft. When the processing unit 16 comprises an input 32, it is also adapted to detect icing atmospheric conditions according to the water content determined and the value of the temperature of the external air received as described in the detection method described below.

The processing unit 16 comprises a calculation unit 26 and a storage unit 28 able to store instructions for implementing a method for determining water content according to the invention.

The calculation unit 26 is able to execute the instructions stored in the storage unit 28. The storage unit 28 also contains predetermined distributions of the number of particles according to the size of the particles in an estimated range of sizes. These distributions are typical distributions of the number of particles according to their size. They were previously established from numerous measurements. In the example of embodiment described below, the storage unit 28 comprises a predetermined distribution 34 for the water particles in a first estimated range of sizes PE1, a predetermined distribution 84 for the water particles in a second estimated range of sizes PE2, a predetermined distribution 34 for the ice particles in the first estimated range of sizes PE1, a predetermined distribution for the ice particles in the second estimated range of sizes PE2.

In a variant, the distributions are established according to the outside temperature. In this case, the calculation unit 26 is able to receive an outside temperature value and to select the pre-established distribution for this temperature value. Two examples of distribution of water particles have been illustrated in FIG. 8. The distributions of ice particles have not been shown.

Figure 4:
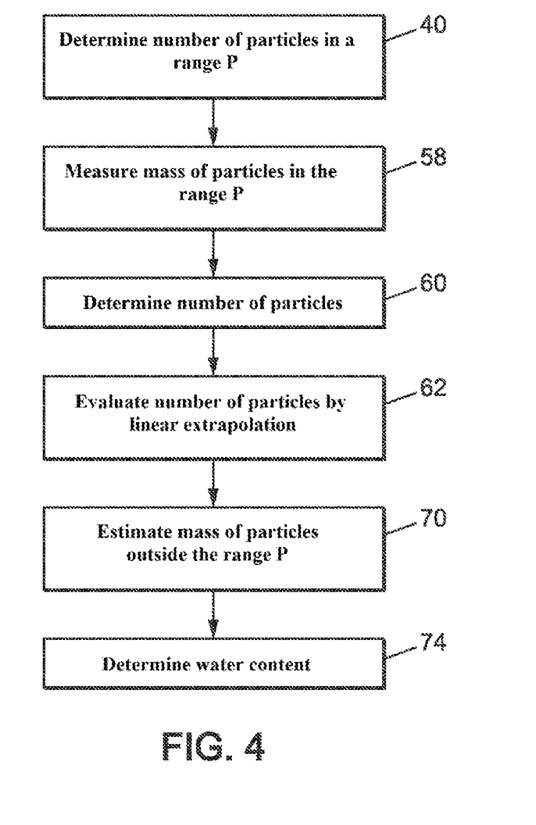
FIG. 4 is a diagram of the steps of the determination method according to a first embodiment of the invention.

With reference to FIG. 4, the determination method according to the first embodiment of the invention begins with a step 40 during which the processing unit 16 determines the number of particles 10, 12 in the sampling volume 14. These particles 10, 12 are contained only in a given range P of sizes because of the excessively great variance in the sizes of the particles compared with the performances (resolutions, dynamic range) of existing images.

The range of given sizes that can be measured by the imager 8 is defined by the acquisition parameters. Preferably, the acquisition parameters are defined so that the given range of sizes P is between 50 micrometres and 1000 micrometres. And advantageously the acquisition parameters are chosen so that the given range of sizes P is between 70 micrometres and 700 micrometres.

Figure 13:
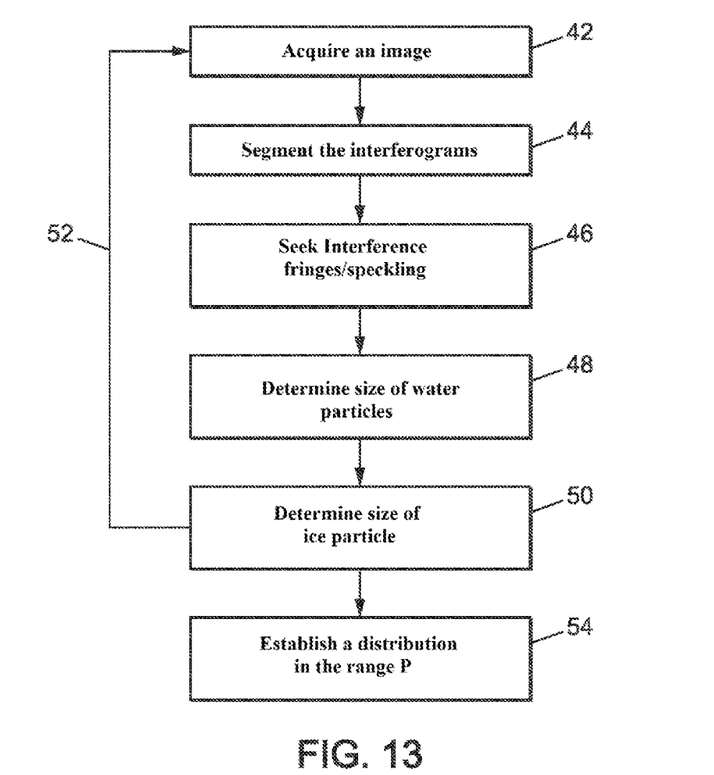
FIG. 13 is a diagram of the substeps of the method for determining the number of particles in the given size range P.

The determination step 40 comprises subsets 42 to 54 shown in a FIG. 13.

Figure 3:
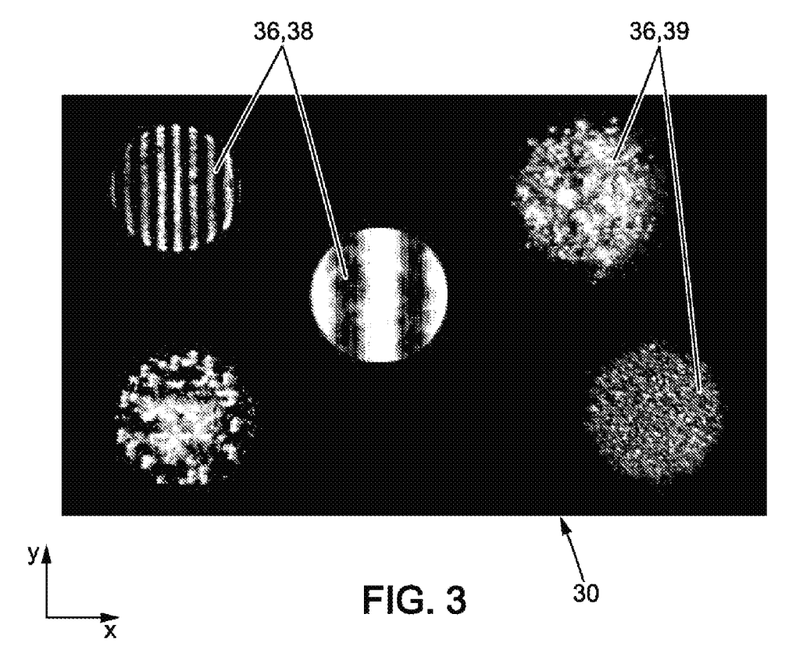
FIG. 3 is a schematic representation of an image acquired by the determination device shown in FIG. 1.

During a substep 42, the imager 8 acquires an image 30 representing the sampling volume 14. An example of such an image 30 is shown in FIG. 3.

The image 30 contains a number of interferograms 36 equal to the number of particles 10, 12 that there are in the sampling volume 14 at the time that the image is taken. The interferograms 36 are all in the form of a disc with the same diameter whatever the size of the particles. The diameter of the interferograms is calculated using the acquisition parameters of the imager. The discs containing parallel interference fringes 38 correspond to water particles 11. The discs containing speckles 39 represent ice particles 12.

During a substep 44, the interferograms are separated from the background of the image by segmentation.

To this end, an adaptive thresholding is carried on the whole of the image 30 according the mean level of grey of the image, followed by a median filtration. A morphological opening (an erosion followed by a dilation) is next carried out in order to eliminate the objects that are too small to belong to an interferogram of known fixed size. A series of successive dilations are carried out in order to connect the remaining elements to form the markers of the interferograms that are sought. The centres of these markers are next sought. The original image is next masked with discs the centres of which are those of the markers. These discs have a diameter equal to that of the interferograms. This diameter is calculated from the acquisition parameters.

During a substep 46, the interferograms 36 representing water particles 11 and the interferograms 36 representing ice particles 12 are sought. For each segmented interferogram, the autocorrelation function along the y axis is calculated. When the width halfway up the autocorrelation peak obtained is less than a defined threshold, then this interferogram represents a water particle 11, otherwise this interferogram represents an ice particle 12. The threshold is defined according to the acquisition parameters.

During a substep 48, for each interferogram 36 representing a water particle, the size di of this particle is calculated. To this end, the Fourier transform of the interferogram is calculated, and the interfringe is deduced therefrom. Then the size di of the water particle 11 is calculated from this interfringe using the conventional ILIDS equation described in the document "G Koenig, K Anders, and A Frohn. *A new light-scattering technique to measure the diameter of periodically generated, moving droplets. Journal of Aerosol Sciences,* 17:157-167, 1986".

During a substep 50, for each interferogram 36 of an ice particle 12 identified, the size di of this ice particle is measured by implementing a two-dimensional autocorrelation function of the speckle pattern 39. This autocorrelation function makes it possible to obtain a distribution in the form of a peak. Then the width halfway up the peak is measured. The size di of the ice particle 12 on a plane parallel to the image acquisition plane 22 is evaluated from this width halfway up, as described in the scientific publications such as "D Chichea. Biospeckle size and contrast measurement application in particle sizing and concentration assessment. *Biophysics,* Sep. 12, 2006".

Advantageously, during a substep 52, the method returns the substep 50. Steps 42 to 50 are performed on a plurality of images in order to obtain a result representing the overall nature of the atmosphere.

Figure 5:
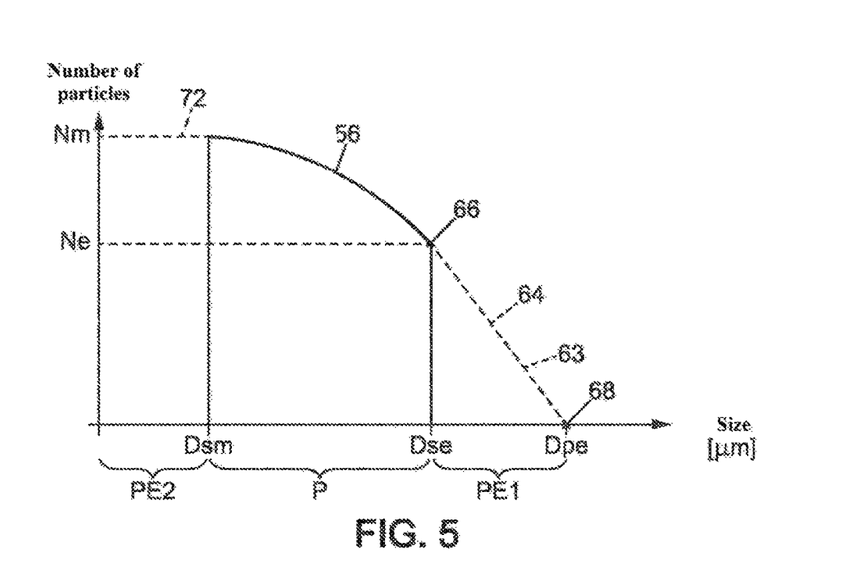
FIG. 5 is a graph showing a distribution of the number of water particles as a function of the size of these particles obtained by the implementation of a first and second method.

During a substep 54, a distribution 56 of the number of water particles 10 according to the size of these particles is established in the given range of sizes P. An example of such a distribution 56 is shown in FIG. 5. A distribution of the number of ice particles according to the size of these ice particles is also established in the given range of sizes P. The distribution established for the ice particles has not been shown.

With reference to FIG. 4, the determination method according to the first embodiment continues with a step 58 during which the mass of the particles 10, 12 is measured in the given range of sizes P from the sizes determined during step 40.

The mass of water in the sampling volume 14 is calculated. For this purpose, the volume of each water particle 10 identified in the image is calculated using the formula $\pi di^3/6$ where di is the size calculated during the substep 48. Then the volumes calculated for each water particle are added in order to determine the volume of all the water particles contained in the sampling volume. The mass of water corresponding to this volume is calculated by multiplying the density of water by the volume of all the water particles. Finally, this mass of water is divided by the sampling volume defined in cubic metres.

The mass of ice in the sampling volume 14 is calculated. For this purpose, the volume of each particle of ice identified in the image is calculated from mass-diameter laws considering the size di calculated during the substep 50, and using a method such as the one proposed by Heymsfield in "Andrew J Heymsfield. Refinements to Ice Particle Mass Dimensional and Terminal Velocity Relationships for Ice Clouds. Part II: Evaluation and Parameterizations of Ensemble Ice Particle Sedimentation Velocities. *Journal of the Atmospheric Sciences* 2006". Then the masses calculated for each ice particle added in order to determine the mass of all the ice particles contained in the sampling volume. Finally, this mass of ice is divided by the sampling volume defined in cubic metres.

The mass of water and the mass of ice are next added in order to obtain the mass of particles 10, 12 lying in the given range of sizes P.

Then the steps 60 to 70 are implemented in order to estimate the mass of particles having sizes containing each range of sizes not imaged by the imager 8. For example, in the example embodiment illustrated in FIG. 5, steps 60 to 70 are first of all implemented in order to estimate the mass of particles having sizes contained in a first evaluated range of sizes PE1. Then steps 60 to 70 are implemented in order to estimate the mass of particles having sizes contained in a second evaluated range of sizes PE2.

In the example embodiment illustrated in FIG. 5, a first linear extrapolation method is used to estimate the mass of particles having sizes contained in the first evaluated range of sizes PE1 and a second linear extrapolation method is used to estimate the mass of particles having sizes contained in the second evaluated range of sizes PE2.

The first method is implemented in a range of sizes having sizes greater than the sizes of the given range of sizes.

According to this first method:

During a step 60, the number of particles of water Ne having a size di equal to a threshold size Dse is determined. Then the number of particles of ice Ng not shown having a size di equal to a threshold size not shown Dsg is determined.

The threshold sizes Dse and Dsg are sizes lying in the given range of sizes P. Preferably, the threshold sizes Dse and Dsg are the largest sizes in the given range of sizes.

During a step 62, the distribution 63 of the number of water particles in the estimated range of sizes PE1 is evaluated by linear extrapolation of the distribution 56, as can be seen in FIG. 5. This linear extrapolation is performed using the number of water particles Ne having a threshold size Dse and a size Dpe predefined by the regulations in force at the time of implementation of the invention. Currently, these regulations are the regulations CS25.

This predefined size Dpe is the theoretical size beyond which there are no longer any water particles in the atmosphere. According to the regulations CS25, the predefined size Dpe is substantially equal to 2300 micrometres.

In practice, the distribution 63 is shown in FIG. 5 by a straight line 64 connecting a point 66 to the point 68. The point 66 is defined by the number of water particles Ne and the threshold size Dse. The point 68 is defined by an absence of water particles 10 having a size Dpe greater than approximately 2300.

Then the distribution of the number of ice particles in the estimated range of sizes PE1 is evaluated by linear extrapolation of the distribution of the number of ice particles in the given range of sizes P. This linear extrapolation is carried out using the number Ng of particles of ice having a threshold size Dsg and a predefined size Dpg defined by the regulations in force at the time of implementation of the invention. Currently these regulations are the regulations CS33. This predefined size Dpe is the theoretical size beyond which there are no longer any ice particles in the atmosphere. According to the regulations CS33, the predefined size Dpg is substantially equal to 2700 micrometres.

During a step 70, the mass of water particles having a size lying in the estimated range of sizes PE1 is obtained from the distribution 63 of the number of water particles estimated and the mathematical relationship explained in step 58. In the same way, the mass of ice particles having a size lying in the estimated range of sizes PE1 is obtained from the distribution of the number of ice particles estimated and from the mass-diameter laws as explained in step 58. The mass of water particles and the mass of ice particles are then added.

Figure 6:
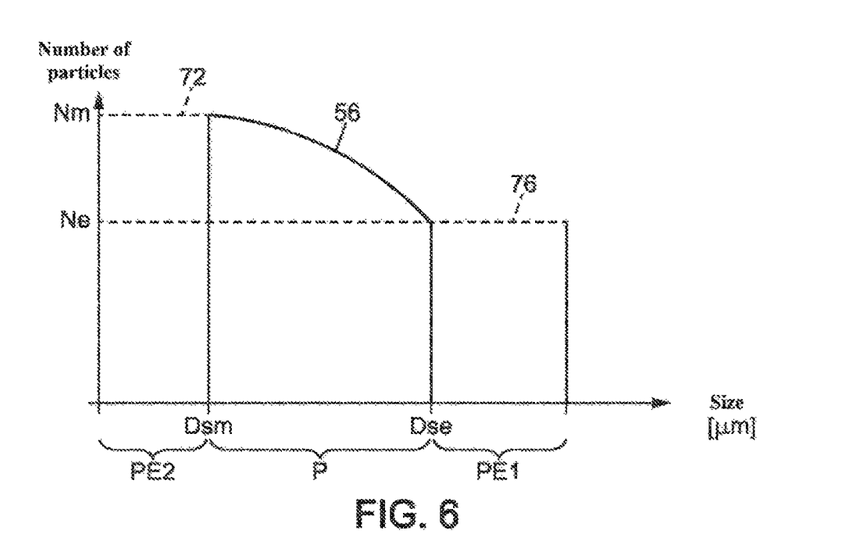
FIG. 6 is a graph showing the distribution of the number of water particles as a function of the size of these particles obtained by the implementation solely of the second method.

The second method is implemented in a range of sizes having sizes less than the sizes of the given range of sizes.

According to the second method:

During a step 60, the number of water particles Nm having a size di equal to a threshold size Dsm is determined. Then the number of ice particles having a size di equal to a threshold size Dsmg is determined.

The threshold sizes Dsm and Dsmg are sizes lying in the given range of sizes P. Preferably, the threshold sizes Dse and Dsg are the smallest sizes in the given range of sizes.

During a step 62, the number of water particles evaluated in the evaluated range of sizes PE2 is considered to be constant whatever the size of the particles. This number is equal to the number of particles determined at step 60, that is to say the number of particles having a size equal to the threshold size Dsm.

In the same way, the number of ice particles in the evaluated range of sizes PE2 is considered to be constant. It is equal to the number of particles determined at step 60, that is to say the number of particles having a size equal to the threshold size Dsmg.

During a step 70, the mass of water particles and the mass of ice particles having a size lying in the estimated range of sizes PE2 is calculated.

During a step 74, the water content is determined by adding the mass of water and ice particles having a size lying in the given range of sizes P, the mass of water and ice particles having a size in the first estimated range of sizes PE1 and the mass of water and ice particles having a size in the second estimated range of sizes PE2.

In a variant, the water content is determined using the method solely on two ranges of sizes. For example, the method may be implemented solely on the given range of sizes P and on the first estimated range of sizes PE1 or only on the given range of sizes P and the second estimated range of sizes PE2. In this case, the water content is not determined in the whole of the range of sizes required by current regulations.

According to a variant of the first embodiment, the distribution 76 of the number of particles in the first estimated range of sizes PE1 and the distribution 72 of the number of particles in the second estimated range of sizes PE2 are made by the second method described above.

In particular, the distribution 76 is obtained:
- by determining the number of water particles Ne having a size di equal to the threshold size Dse and by determining the number of ice particles having a size di equal to the threshold size Dsg, and
- by considering that the number of water particles in the first evaluated range of sizes PE1 is constant and equal to the number of water particles Ne having the size Dse and that the number of ice particles in the first evaluated range of sizes PE1 is constant and equal to the number of ice particles having the size Dsg.

Figure 7:
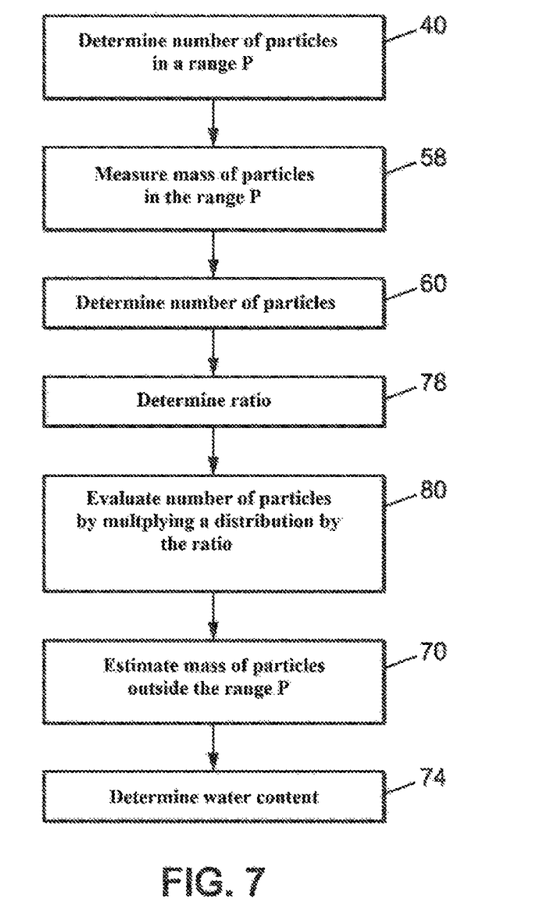
FIG. 7 is a diagram of the steps of the determination method according to a second embodiment of the invention.

With reference to FIG. 7, the determination method according to a second embodiment of the invention comprises steps 40 to 60, 70 and 74 identical to steps 40 to 60, 70 and 74 of the determination method according to the first embodiment. These steps will not be described again.

During step 60 of the determination method according to the second embodiment, the number of water particles Ne having a size equal to the threshold size Dse and the number of ice particles Ng having a size di equal to the threshold size Dsg were determined.

Figure 8:
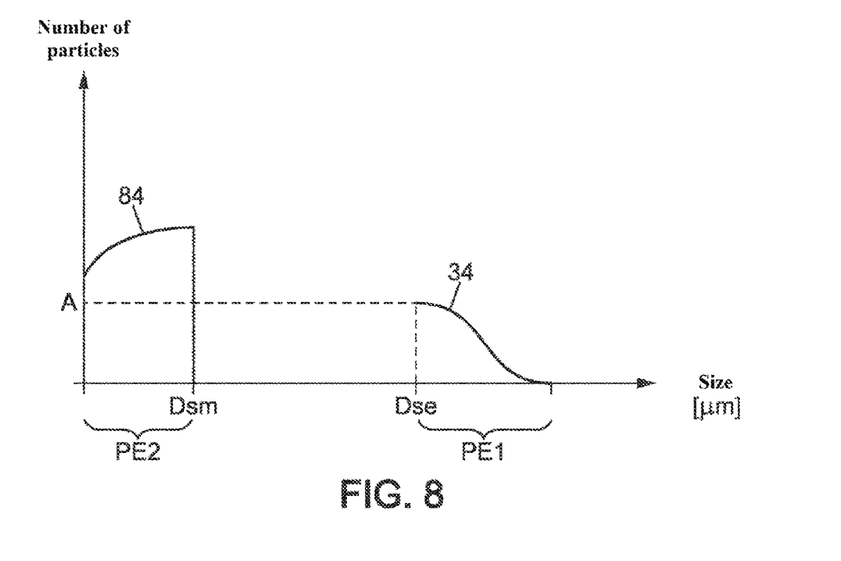
FIG. 8 is a graph showing a predetermined distribution of the number of water particles as a function of the size of the water particles in two estimated size ranges PE1 and PE3.

During a step 78 implemented after step 60, the calculation unit determines the number A of water particles having the threshold size Dse of the predefined distribution 34 recorded in the storage unit 28, as shown in FIG. 8. Then the calculation unit calculates the ratio between firstly the number of water particles Ne having the threshold size Dse and secondly the number A.

A similar ratio is also calculated for the ice particles. This ratio is established between:
- firstly the number of ice particles having the threshold size Dsg of a predefined distribution of ice particles recorded in the storage unit 28, and
- secondly the number of ice particles having the threshold size Dsg of the predefined distribution recorded in the storage unit 28.

Figure 9:
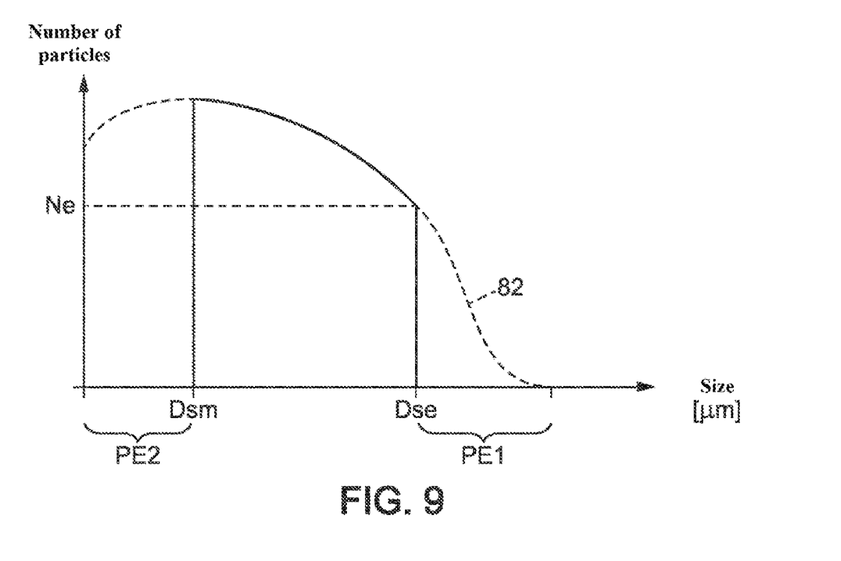
FIG. 9 is a graph showing the distribution of the number of water particles as a function of the size of these particles obtained by the implementation of the second embodiment of the invention.

During step 80, the number of water particles having a size contained in the first range of sizes PE1 is evaluated by multiplying the distribution of the water particles 34 by the ratio calculated during step 78 for the water particles. Thus all the numbers of particles of the predefined distribution 34 are multiplied by the determined ratio. This multiplication makes it possible for example to obtain a distribution 82 of the water particles in the first evaluated range of sizes PE1 as illustrated in FIG. 9.

In the same way, the number of ice particles having a size contained in the first range of sizes PE1 is evaluated by multiplying the distribution of ice particles by the ratio calculated during step 78 for the ice particles.

Steps 60 to 80 are also implemented in order to evaluate the number of water particles and the number of ice particles having a size contained in the second estimated range of sizes PE2. This time predefined distributions of the number of particles in the second evaluated range of sizes PE2 are used.

The number of particles evaluated during step 80 is used to estimate the mass of particles during step 70 as described in the first embodiment of the invention.

Figure 10:
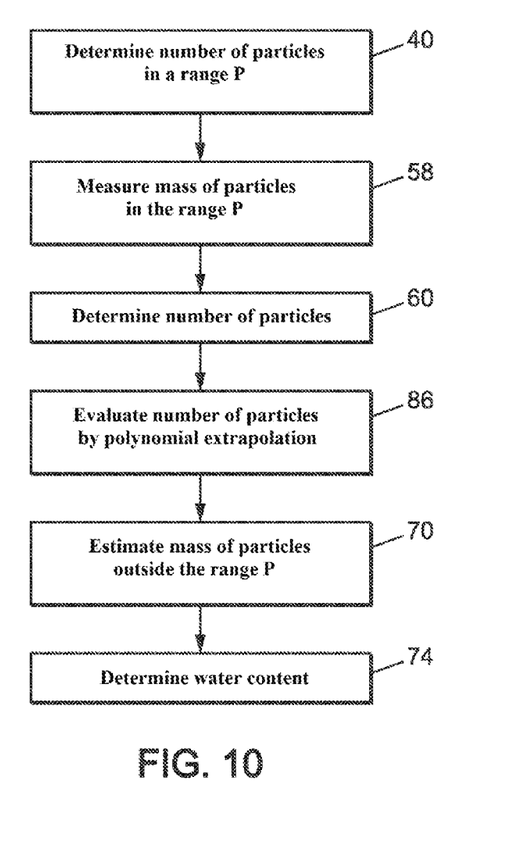
FIG. 10 is a diagram of the steps of the determination method according to a third embodiment of the invention of the invention.

With reference to FIG. 10, the determination method according to the third embodiment of the invention comprises steps 40 to 60, 70 and 74 identical to steps 40 to 60, 70 and 74 of the determination method according to the first embodiment. These steps will not be described again.

The determination method according to a third embodiment of the invention comprises, instead of step 62, a step 86, during which the number of particles is estimated by polynomial extrapolation and in particular by logarithmic extrapolation.

Figure 11:
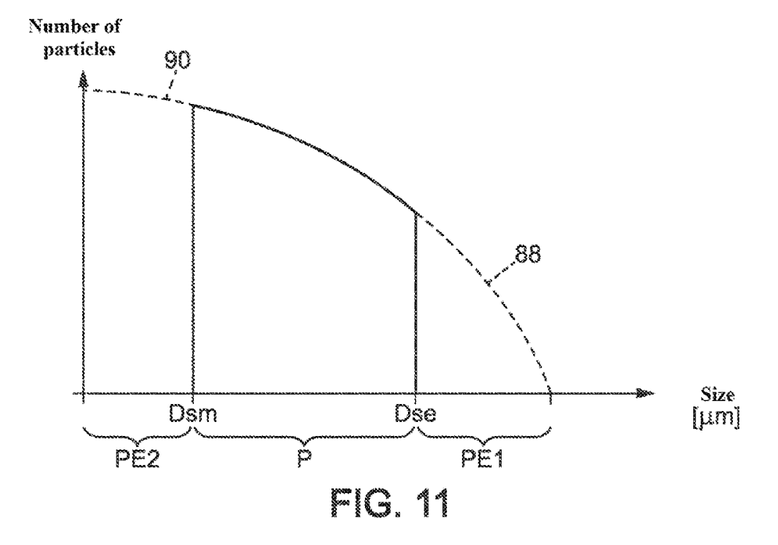
FIG. 11 is a graph showing the distribution of the number of water particles as a function of the size of these particles obtained by the implementation of the third embodiment of the invention.

FIG. 11 illustrates distributions 88, 90 of the number of particles on the first PE1 and second PE2 estimated ranges of sizes. These distributions 88, 90 were obtained by logarithmic extrapolation from the numbers of particles having the threshold size Dsm and respectively the threshold size Dse.

In a variant, all these methods and embodiments can be combined with each other in order to determine the mass of ice and the mass of water in the first PE1 and second PE2 estimated ranges of sizes.

Figure 12:
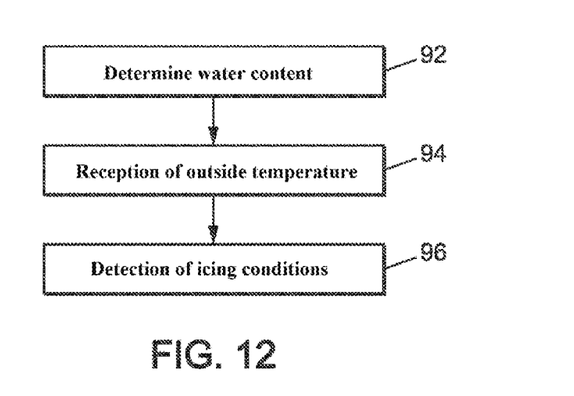
FIG. 12 is a diagram of the steps of the method for detecting icing conditions according to the invention.

Finally, the invention also relates to a method for detecting icing conditions, illustrated in FIG. 12.

This method for detecting icing conditions begins with a step 92 during which the processing unit 16 determines the water content by implementing the determination method described above.

Then, during a step 94, the input 32 of the processing unit receives an outside temperature value.

Finally, during a step 96, the processing unit 16 detects the presence of icing atmospheric conditions from the water content of the outside temperature value by applying the current regulations and in particular the previously mentioned CFR standards.

The invention claimed is:

1. A method for determining the water content in the atmosphere by processing images acquired by an out-of-focus interferometric imaging device, said device being solely able to image water and ice particles having a size lying in a given range of sizes, said method comprising the following steps:
   a) obtaining at least one of the images produced by the out-of-focus interferometric imaging device;
   b) determining the number of particles lying in the given range of sizes from said at least one of the images;
   c) measuring the mass of particles having a size lying in the given range of sizes from the number of particles determined;
   d) estimating the mass of particles having a size outside the given range of sizes, said estimation step comprising the following steps:
      i) determining the number of particles having a size equal to a threshold size;
      ii) evaluating the number of particles outside the given range of sizes from the number of particles determined during step i) and from the threshold size; and
      iii) estimating the mass of the particles outside the given range of sizes from the number of particles evaluated; and
   e) determining the water content in the atmosphere by adding the estimated mass and the measured mass.

2. The method for determining the water content in the atmosphere according to claim 1, in which the number of particles evaluated during step ii) is considered to be constant and equal to the number of particles determined at step i) having a size equal to the threshold size.

3. The method for determining the water content in the atmosphere according to claim 1, in which said method is implemented by a processing unit comprising a calculation unit and a storage unit, said storage unit comprising at least a predetermined distribution of the number of particles according to the size of these particles outside said given range of sizes, said predetermined distribution comprising a number of particles having said threshold size, and in which the number of particles is evaluated by multiplying the predetermined distribution by the ratio between the number of particles determined at step i) and the number of particles in said distribution having said threshold size.

4. A computer program containing instructions for implementing the determination method according to claim 1, when it is executed by a processor.

5. The method for determining the water content in the atmosphere according to claim 1, in which the number of particles is evaluated during the step ii) by polynomial extrapolation from a plurality of numbers of particles determined at step i) and from the size of these particles.

6. The method for determining the water content in the atmosphere according to claim 5, in which the polynomial extrapolation uses a logarithmic equation.

7. The method for determining the water content in the atmosphere according to claim 1, in which the given range of sizes is between 50 micrometres and 1000 micrometres.

8. The method for determining the water content in the atmosphere according to claim 7 in which the given range of sizes is between 70 micrometres and 700 micrometres.

9. The method according to claim 1 which further detects icy atmospheric conditions, the method further comprising the following steps:
   receiving an external temperature value; and
   detecting icy atmospheric conditions from the water content and the external temperature value.

10. A computer program containing instructions for implementing the detection method according to claim 9, when it is executed by a processor.

11. The method for determining the water content in the atmosphere according to claim 1, in which the number of particles is evaluated during step ii) by linear extrapolation from a predefined size beyond which there are no longer any particles in the atmosphere.

12. The method for determining the water content in the atmosphere according to claim 11, in which the particles are water particles, and the predefined size is substantially equal to 2300 micrometres.

13. The method for determining the water content in the atmosphere according to claim 12, in which, when the particles are ice particles, the predefined size is substantially equal to 2700 micrometres.

14. The method for determining the water content in the atmosphere according to claim 11, in which, when the particles are ice particles, the predefined size is substantially equal to 2700 micrometres.

* * * * *